(12) United States Patent
Handley

(10) Patent No.: US 8,768,745 B2
(45) Date of Patent: Jul. 1, 2014

(54) SYSTEM AND METHOD OF FORECASTING PRINT JOB RELATED DEMAND

(75) Inventor: John C Handley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 840 days.

(21) Appl. No.: 12/183,154

(22) Filed: Jul. 31, 2008

(65) Prior Publication Data

US 2010/0030617 A1 Feb. 4, 2010

(51) Int. Cl.
*G06Q 10/00* (2012.01)
*G06Q 30/00* (2012.01)

(52) U.S. Cl.
USPC ........................................................ 705/7.31

(58) Field of Classification Search
USPC ........................................................ 705/7.31
See application file for complete search history.

(56) References Cited

U.S. PATENT DOCUMENTS

| | | | |
|---|---|---|---|
| 5,970,224 A * | 10/1999 | Salgado et al. ............... | 358/1.16 |
| 6,611,726 B1 * | 8/2003 | Crosswhite ..................... | 700/99 |
| 6,650,433 B1 * | 11/2003 | Keane et al. .................. | 358/1.15 |
| 6,805,502 B2 | 10/2004 | Rai et al. | |
| 6,941,013 B1 * | 9/2005 | Drayer ........................... | 382/168 |
| 7,002,702 B1 | 2/2006 | Machida | |
| 7,051,328 B2 | 5/2006 | Rai et al. | |
| 7,061,636 B2 | 6/2006 | Ryan et al. | |
| 7,079,266 B1 | 7/2006 | Rai et al. | |
| 7,125,179 B1 | 10/2006 | Rai et al. | |
| 7,152,589 B2 | 12/2006 | Ekeroth et al. | |
| 7,230,744 B2 * | 6/2007 | Christodoulou et al. ..... | 358/407 |
| 7,242,302 B2 | 7/2007 | Rai et al. | |
| 7,562,062 B2 | 7/2009 | Ladde et al. | |
| 7,584,116 B2 | 9/2009 | Kakouros et al. | |
| 7,716,022 B1 * | 5/2010 | Park et al. ......................... | 703/2 |
| 7,755,778 B2 | 7/2010 | Rai et al. | |
| 7,953,681 B2 | 5/2011 | Rai | |
| 2001/0055123 A1 | 12/2001 | Ryan et al. | |
| 2002/0124756 A1 | 9/2002 | Rai et al. | |
| 2002/0129081 A1 | 9/2002 | Rai et al. | |
| 2003/0149747 A1 | 8/2003 | Rai et al. | |
| 2004/0130745 A1 | 7/2004 | Fabel et al. | |
| 2004/0267485 A1 | 12/2004 | Penov et al. | |
| 2006/0224440 A1 | 10/2006 | Rai | |
| 2006/0226980 A1 | 10/2006 | Rai et al. | |
| 2006/0241900 A1 * | 10/2006 | Hu et al. ........................ | 702/179 |
| 2007/0019228 A1 | 1/2007 | Rai et al. | |
| 2007/0078585 A1 | 4/2007 | Pomeroy et al. | |

(Continued)

OTHER PUBLICATIONS

U.S. Appl. No. 11/868,993 to Rai et al. entitled System and Method of Forecasting Print Job Related Demand (filed on Oct. 9, 2007 and published on Apr. 9, 2009 as U.S. Patent Application Publication No. 20090094094).

(Continued)

*Primary Examiner* — Stephanie Delich
(74) *Attorney, Agent, or Firm* — Fox Rothschild LLP

(57) ABSTRACT

There is provided a print demand forecasting system and method for use with a print production system in which print demand data is collected for each print job processed during a selected time interval. The collected print demand data is stored in memory and then processed to obtain a first time series component and a second time series component. The first and second time series components are corresponded respectively with first and second forecast models. One of the first and second forecast models is selected with an S process, and the selected one of the first and second forecast models is used to obtain forecast data.

15 Claims, 11 Drawing Sheets

(56) References Cited

U.S. PATENT DOCUMENTS

| | | |
|---|---|---|
| 2007/0091355 A1 | 4/2007 | Rai |
| 2007/0092323 A1 | 4/2007 | Lin et al. |
| 2007/0124182 A1 | 5/2007 | Rai |
| 2007/0177191 A1 | 8/2007 | Eschbach et al. |
| 2007/0236724 A1 | 10/2007 | Rai et al. |
| 2007/0247657 A1 | 10/2007 | Zhang et al. |
| 2007/0247659 A1 | 10/2007 | Zhang et al. |
| 2007/0279675 A1 | 12/2007 | Quach et al. |
| 2007/0293981 A1 | 12/2007 | Rai |
| 2008/0285067 A1 | 11/2008 | Rai |
| 2009/0021773 A1 | 1/2009 | Rai |
| 2009/0021774 A1 | 1/2009 | Rai |
| 2009/0021775 A1 | 1/2009 | Rai |
| 2009/0157579 A1 | 6/2009 | Rai |
| 2010/0290079 A1 | 11/2010 | Rai et al. |

OTHER PUBLICATIONS

Julian J. Faraway, Extending the Linear Model with R: Generalized Linear, Mixed Effects and Nonparametric Regression Models, Chapman & Hall/CRC, 2005.

Mestha et al., "Control Elements in Production Printing and Publishing Systems: DocuColoriGen3", Conference on Decision and Control, Dec. 2003, Proceedings of the 42nd IEEE.

Potts et al., "Scheduling with batching: A review", European Journal of Operational Research 120 (2000) 228-249.

Crovella et al., "Task Assignment in a Distributed System: Improving Performance by Unbalancing Load", ACM SIGMETRICS Performance Evaluation Review, vol. 26, No. 1, ACM, 1998.

Schroeder et al., "Evaluation of Task Assignment Policies for Supercomputing Servers: The Case for Load Unbalancing and Fairness", Cluster Computer 7.2 (2004): 151-161.

\* cited by examiner

SYSTEM AND METHOD OF FORECASTING PRINT JOB RELATED DEMAND

BACKGROUND AND SUMMARY

The disclosed embodiments relate generally to a system and method for improving the operability of a print production environment and, more particularly to an improved approach for forecasting print production demand in the print production environment.

Document production environments, such as print shops, convert printing orders, such as print jobs, into finished printed material. A print shop may process print jobs using resources such as printers, cutters, collators and other similar equipment. Typically, resources in print shops are organized such that when a print job arrives from a customer at a particular print shop, the print job can be processed by performing one or more production functions.

In one example of print shop operation, product variety (e.g., the requirements of a given job) can be low, and the associated steps for a significant number of jobs might consist of printing, inserting, sorting and shipping. In another example, product variety (corresponding, for instance, with job size) can be quite high and the equipment used to process these jobs (e.g. continuous feed machines and inserting equipment) can require a high changeover time. Experience working with some very large print shops has revealed that print demand exhibits a tremendous variety of time series behavior.

Forecasting demand for a given large print shop can be useful in, among other things, managing shop resources. However, traditional approaches of forecasting (as found in associated literature) may be insufficient to suitably forecast demand in large print shops with considerable print job variability. For instance, in literature relating to forecasting a preference toward using pooled demand forecast (as opposed to forecasting components individually and summing the forecasts to obtain an aggregate forecast) has been expressed. It has been found, however, that pooled demand forecasting can break down in, among other environments, print production environments when the job related demand exhibits relatively high levels of variability.

In U.S. patent application Ser. No. 11/868,993 to Rai et al. entitled System and Method of Forecasting Print Job Related Demand (filed on Oct. 9, 2007 and published on Apr. 9, 2009 as U.S. Patent Application Publication No. 2009/0094094-A1) demand data is collected for a print production environment and then segmented into a first demand series with at least two demand components and a second demand series with at least one demand component. The demand components are derived with a segmentation technique, which technique can be performed with a database attribute (e.g., an attribute, such as job or form type, client, duplex/simplex (i.e., media "plex"); obtained from a data warehouse, by time slice (e.g., Mondays or firsts of the month), or by statistical thresholding (e.g., demand over and under 30,000 prints). In practice a first demand related forecast is generated with a combination of the at least two demand components and a second demand related forecast may be generated with the at least one demand component. In one approach, the first and second demand related forecasts may be shown or used in an aggregate plot, the aggregate plot being used to obtain forecast demand data for the print production environment.

Forecasting with the disclosed approach of the '993 Patent Application is well suited for its intended purpose. In particular, use of the disclosed approach can clearly lead to significantly improved forecasting (i.e., reasonably low levels of mean absolute percentage error [MAPE]). Nonetheless, it is believed that the approach disclosed and claimed below may, under certain circumstances, result in even lower levels of MAPE.

In one aspect of the disclosed embodiments there is disclosed a print demand forecasting system for use with a print production system in which multiple print jobs are processed over a selected time interval. The print demand forecasting system includes: a data collection tool, said data collection tool collecting print demand data for each print job processed during the selected time interval; mass memory for storing the collected print demand data; a computer implemented service manager for processing the stored print demand data to obtain a first time series component and a second time series component, said computer implemented service corresponding the first time series component with a first forecast model and the second time series component with a second forecast model; and a selector process, operating with said computer implemented service manager to select one of the first forecast model and the second forecast model, the selected one of the first forecast model and the second forecast model being used to obtain forecast data for a selected time outside of the selected time interval.

In another aspect of the disclosed embodiments there is disclosed A print demand forecasting method for use with a print production system in which multiple print jobs are processed over a selected time interval. The print demand forecasting method includes: collecting print demand data for each print job processed during the selected time interval; storing the collected print demand data in memory; processing the stored print demand data to obtain a first time series component and a second time series component; corresponding the first time series component with a first forecast model and the second time series component with a second forecast model; selecting one of the first forecast model and the second forecast model; and using the selected one of the first forecast model and the second forecast model obtain forecast data for a selected time outside of the selected time interval.

DESCRIPTION OF DISCLOSED EMBODIMENTS

Figure 1:
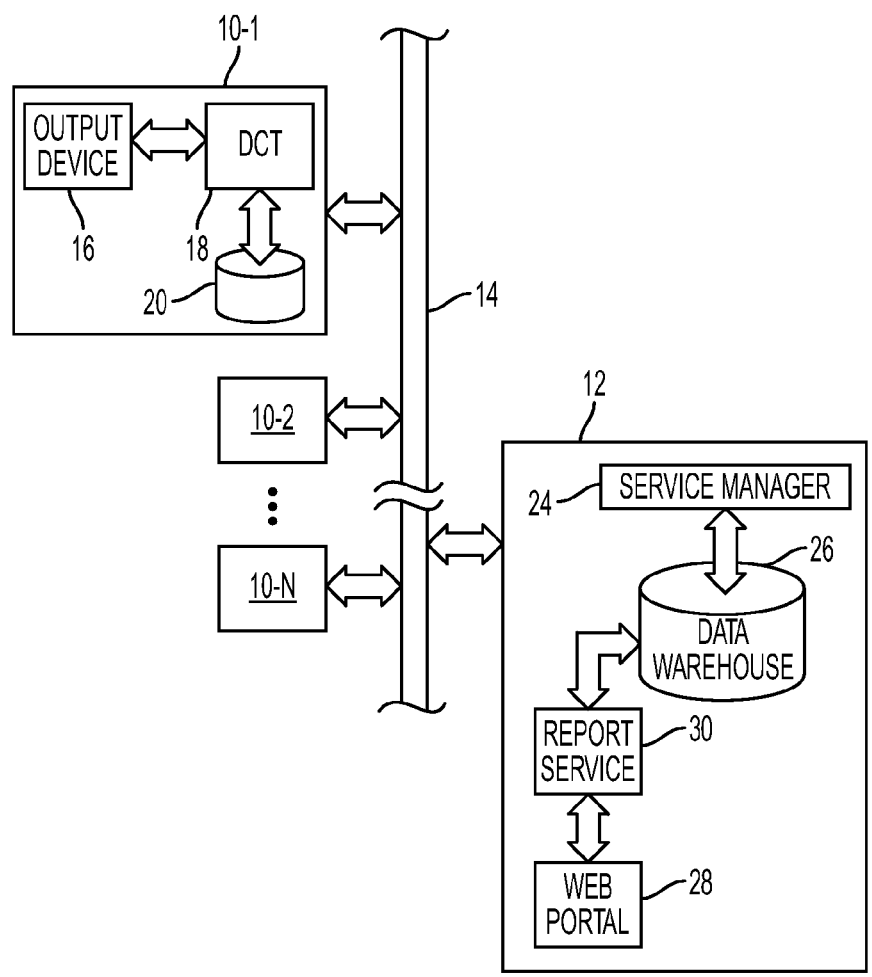
FIG. 1 is a block diagram of a data collection/processing architecture, suitable for use with the disclosed embodiments.

Referring to FIG. 1, a network print production system, with a data processing center, is shown. In the illustrated approach of FIG. 1, a series of document production centers 10-1 through 10-N (collectively referred to as document production centers 10, some of which may include print shops or production print facilities) communicate with the data processing center 12 by way of a network (such as a wide area network (possibly including the world wide web)) 14. At least one of the document production centers (e.g., document production center 10-1) includes an output device 16 communicating with a data collection tool ("DCT") 18. While particular attention is paid below to document production center 10-1, several of the document production centers 10 may include the combination of at least one output device and a DCT. Additionally, as should be apparent to those skilled in the art, the output device 16 may be used in the context of a print shop with a number of other document processing related devices, as illustrated in U.S. Pat. No. 7,079,266 to Rai et al., the pertinent portions of which are incorporated by reference.

In one example, the DCT is a programmable subsystem (possibly assuming the form of a suitable application programmable interface) capable of capturing data, including performance or demand related data, from the output device at selected time intervals. It should be appreciated that, consistent with U.S. Pat. No. 7,242,302 to Rai et al., the pertinent portions of which are incorporated herein by reference, the output device could assume a number of forms, such as a handheld device, PDA, or RFID related device. The DCT 18 may communicate with mass memory 20 for short term storage of, among other things, demand related data. Additionally, a wide variety of performance related information from the output device 16, including information relating to job type, client, duplex/simplex, page counts and impression counts, just to name a few, may be stored in mass memory 20.

The data processing center 12 includes a "service manager" 24 communicating with a "data warehouse" 26. In one illustrated embodiment, the service manager comprises a processing platform that is capable of performing the types of forecasting calculations described below. As contemplated, a variety of data from the document production centers 10, including demand data from mass memory 20, is stored in the data warehouse. The data warehouse may also store job performance related data in the form of a database to facilitate a data segmentation approach, as described below. In the illustrated approach of FIG. 1, output of the service manager is placed in a format (e.g., a report including at least one forecast plot) suitable for communication to a network web portal 28 by a report generating application or service 30. The report, in turn, can be used, to the extent necessary, to adjust operation of the document production center to which the report relates. One such adjustment might include ordering inventory based on the report, while another such adjustment might include using the report to control aggregate or capacity planning.

Figure 2:
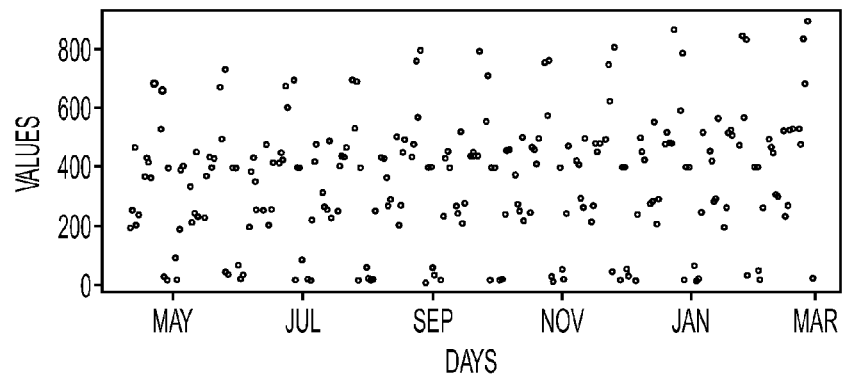
FIG. 2 is a graphical representation of a first time series of impressions for a print production factory.
Figure 3:
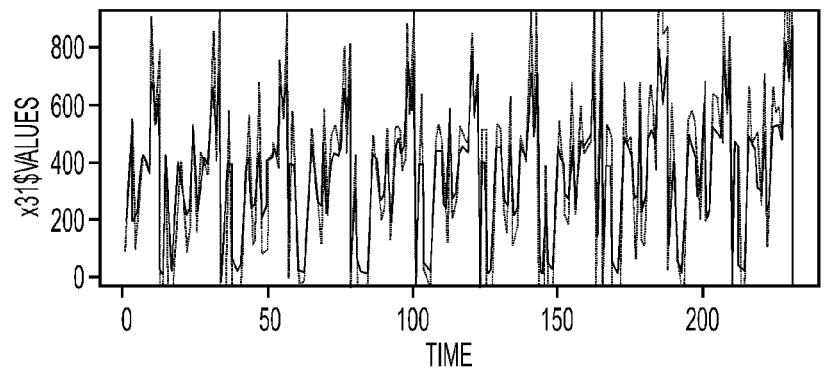
FIG. 3 is a graphical representation based on FIG. 2 in which four interleaved processes are shown as being decomposed with database entries.
Figure 4:
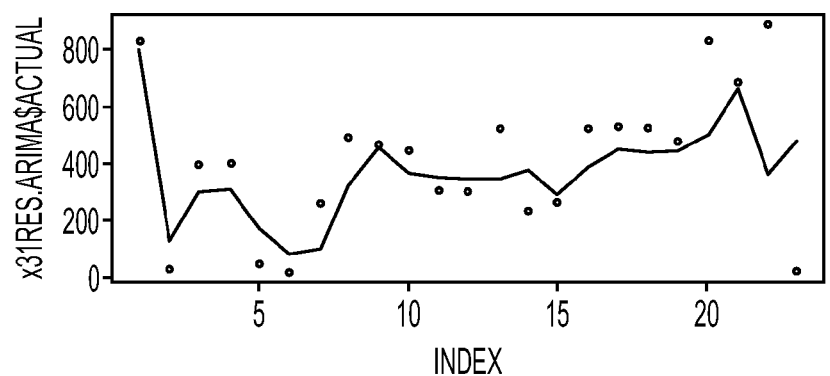
FIG. 4 is a graphical fit (obtained with auto regressive integrated moving average [ARIMA] modeling) for the decomposed time series of FIG. 3.

Referring now to FIG. 2, a time series of impressions for a print production factory is shown. Referring to FIG. 3, the time series of FIG. 2, as best understood by the present inventor, has been decomposed as far as it can using database entries (one product type, duplex, client, etc) and yet still exhibits this behavior of what appears to be four interleaved processes, some with different trends. Some of the processes look periodic, which is good for forecasting. The overall process of FIG. 3 could be modeled by seasonal ARIMA [in fact, the best model the present inventor could find is ARIMA $(0,0,21)\times(0,0,5)_{22}$]. Referring to FIG. 4, a fit for the decomposed time series is shown. The fit using the first 90% of the data seems reasonably good, and if the fit is used to forecast the last 10% of the data, a Median Percentage Absolute Error (MAPE) of 0.242 is obtained. Further information about the application of ARIMA, in the context of time series forecasting, is disclosed in U.S. Pat. No. 7,251,589 to Crowe et al., the pertinent portions of which are incorporated herein by reference.

Figure 5:
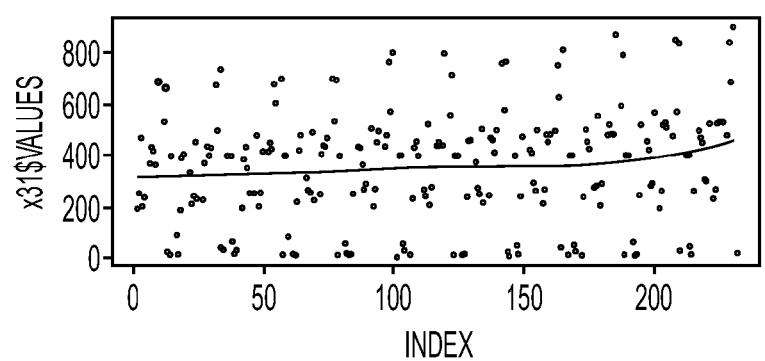
FIG. 5 is a graphical representation of the time series of FIG. 2 initially segmented with a robust smoother.
Figure 6:
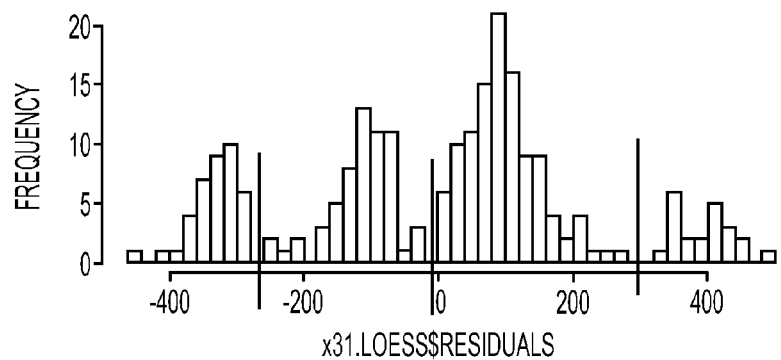
FIG. 6 is a histogram based on a processed FIG. 5.
Figure 7:
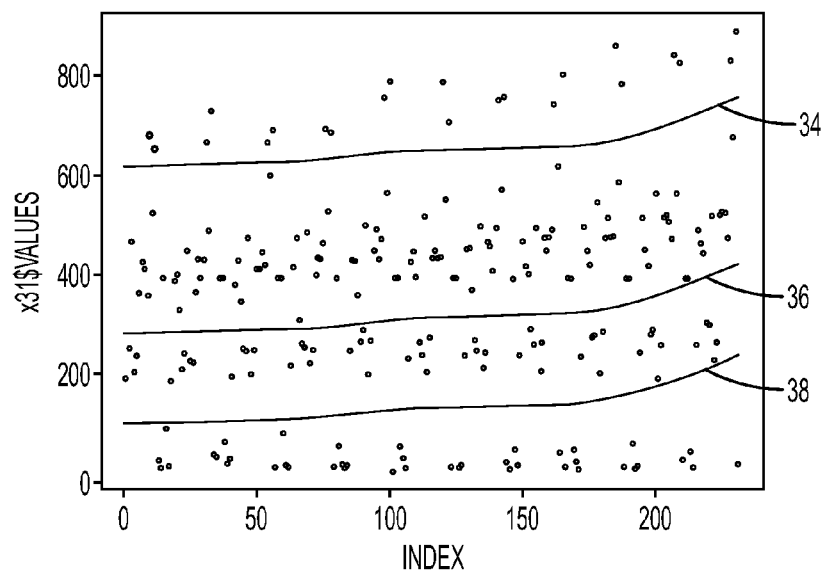
FIG. 7 is a graphical representation of FIG. 2 in which segmenting is performed with thresholds obtained from FIG. 6.
Figure 8A:
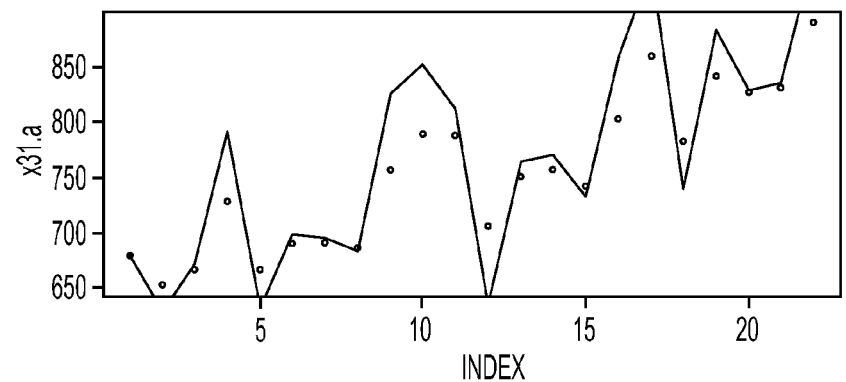
FIGS. 8A-8D are graphically represented components of FIG. 7.
Figure 8B:
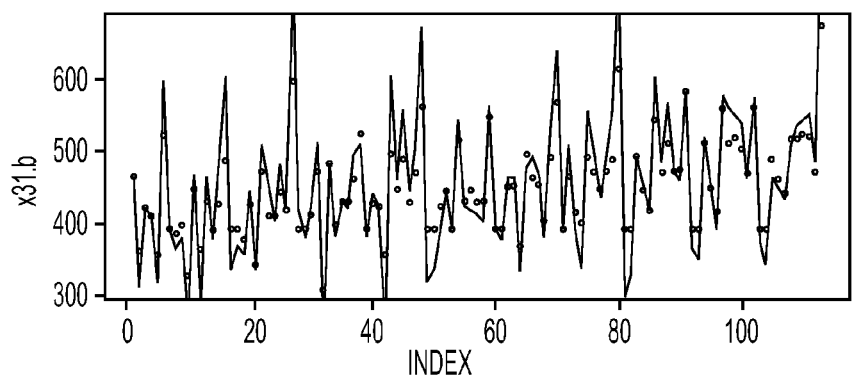
Figure 8C:
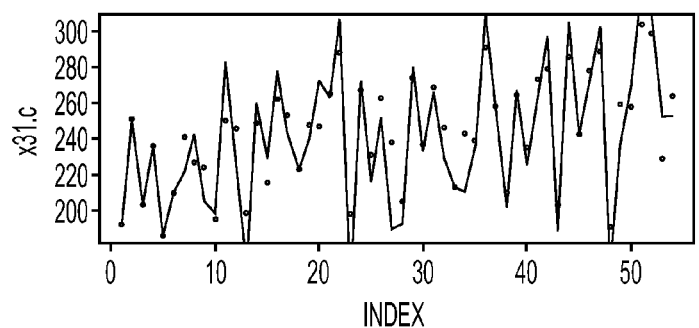
Figure 8D:
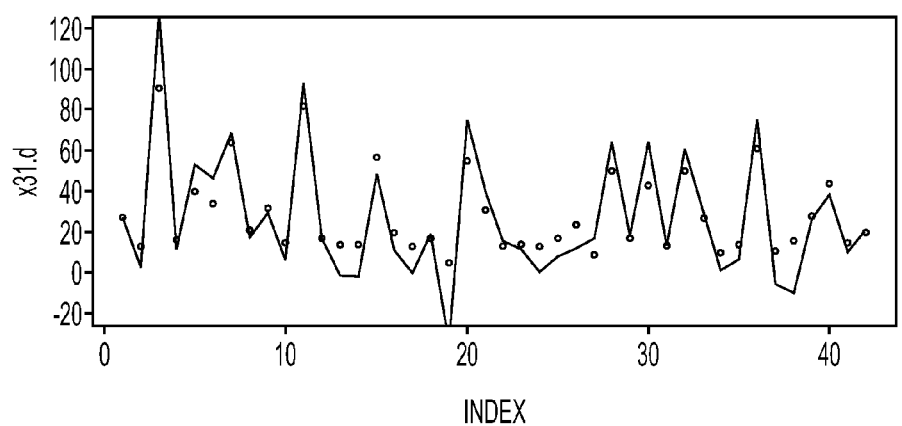

An approach of the disclosed embodiments will now be applied to the time series of FIG. 2. Referring to FIG. 5, the time series is initially segmented with a robust smoother (such as loess, which is a locally linear smoother that ignores large deviations). An application of loess smoothing can be found in U.S. Patent Application Publication No. 20070078585 to Pomeroy et al. (published Apr. 5, 2007), the pertinent portions of which are incorporated herein by reference. Next, smoothed values are subtracted from the time series values and a histogram (FIG. 6) is computed. The thresholds used to split the histogram of FIG. 6 can be found automatically using clustering (k-means) or possibly as a mixture of Gaussians estimated by expectation maximization. In the example of FIG. 6, the thresholds are –219, –38, and 300. Referring to FIG. 7, a time series segmentation may be obtained adding these threshold values to the smoothed time series.

With the time series segmentation of FIG. 7 (including four components separated by curves 34, 36 and 38), each component can be modeled separately. Referring to FIGS. 8A-8D, the four components of FIG. 7 are shown as being modeled respectively with ARIMA $(0,1,1)$, ARIMA$(0,1,2)\times(0,0,4)_{11}$, ARIMA$(0,1,1)\times(0,1,1)_5$ and ARIMA$(2,0,2)\times(1,0,2)_4$. While the respective curves of FIGS. 8A-8D appear to provide reasonably good fits, the four resulting models are very different, with different trends and periods. As will appear, the "glue" that binds these four models together is a selector process S.

Figure 9:
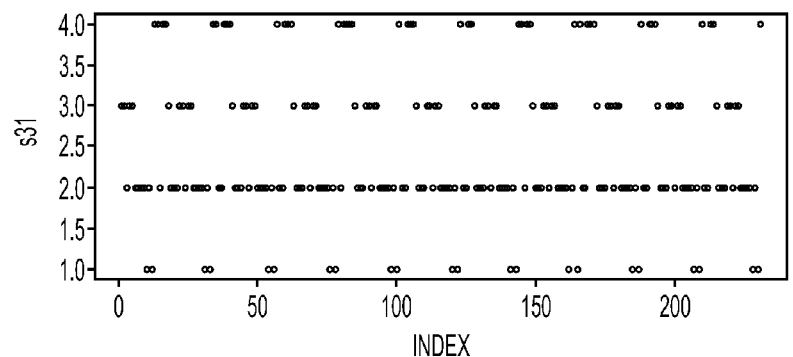
FIG. 9 graphically illustrates the four components of FIG. 8A-8D as four categories or processes.

Referring to FIG. 9, the process S, as applied to the time series of FIG. 7, takes on four categorical values. While these four categories are graphed in FIG. 9 as 1, 2, 3, and 4, the categories could assume the form of four processes. One important aspect of the disclosed embodiments resides in the modeling S. Even though experiments were performed with a variety of methods (including a thresholded version of ARIMA, classification trees, and markov models), none seemed to provide any better results than a multinomial logistic regression. A comprehensive description of the general principles underlying multinomial logistic regression can be found in the following reference: Julian J. Faraway, *Extending the Linear Model with R: Generalized Linear, Mixed Effects and Nonparametric Regression Models*, Chapman & Hall/CRC, 2005.

For the sake of understanding the modeling of S with the multinominal logistic regression, consider a process that takes on four values, {a, b, c, d}, and let the probabilites of the values be $p_a$, $p_b$, $p_c$, and $p_d$, and the sum of the probabilities be 1. The model might then include the following three logistic regression equations (of course, more equations would be formed for additional components:

$$\log\left(\frac{p_b}{p_a}\right) = \alpha_0 + \alpha^T X$$

$$\log\left(\frac{p_c}{p_a}\right) = \beta_0 + \beta^T X$$

$$\log\left(\frac{p_d}{p_a}\right) = \gamma_0 + \gamma^T X$$

Where, $\alpha_0$, $\beta_0$, $\gamma_0$=model parameters to be estimated;

$\alpha^T$, $\beta^T$, $\gamma^T$=model parameters to be estimated; and

X prepresents a co-variate vector (in this case, previous values)

In essence, fitting this model (including solving the above equations) provides a forecaster. It produces an estimator of the probabilities ($p_a$, $p_b$, $p_c$, $p_d$) for a next observation and the best forecast is the one with the highest probability. The above forecaster performs surprisingly well with an error of 2.4%, and has been found to work well as a time series forecaster. Putting the models together operates, in part, as follows:

1) From previous observations $x_1, \ldots, x_t$, segment a time series to produce series $x_a$, $x_b$, $x_c$, and $x_d$ plus selector S.
2) From categorical observations $S_1, \ldots, S_t$, fit a multinomial logistic regression model and use it to forecast $S_{t+1}$.
3) Use the forecasted category to select which model to forecast, e.g., if $S_{t+1}$=c, foreacast model $x_c$. In one example this could be an ARIMA model; in another example this could be exponential smoothing.
4) Report the forecasted value of 3) as the forecast for the process.

Figure 10:
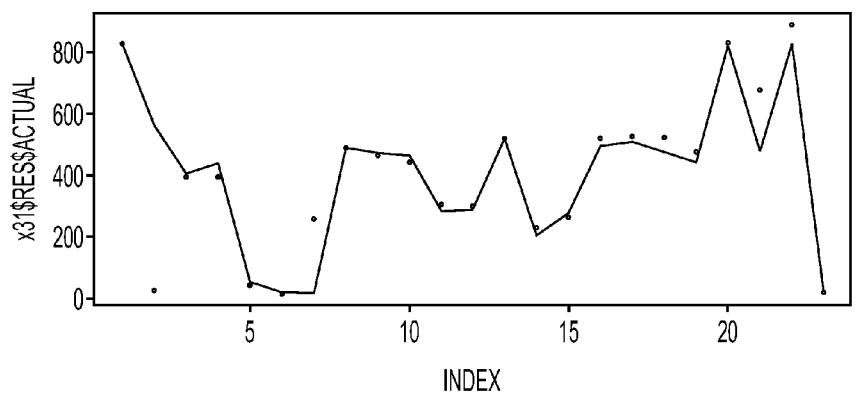
FIG. 10 is a graphical fit for the decomposed time series of FIG. 7.

It has been found that error in modeling of the forecaster for S (e.g., an error of 10%) can produce inadequate forecasts for the process. For the time series of FIG. 2, the following S was determined with the process described above:

S: Multinom(X23~X1+ . . . +X22) (i.e., looks back 22 obs to forecast the next one Referring specifically to FIG. 10, a fit for the decomposed time series of FIG. 7, using the models of FIGS. 8A-8D along with the above expression for S immediately above, is shown. For the exemplary forecast of FIG. 10, the median APE is 0.066, which appears significantly better than the median APE (0.242) of the single ARIMA model described above.

Figure 11:
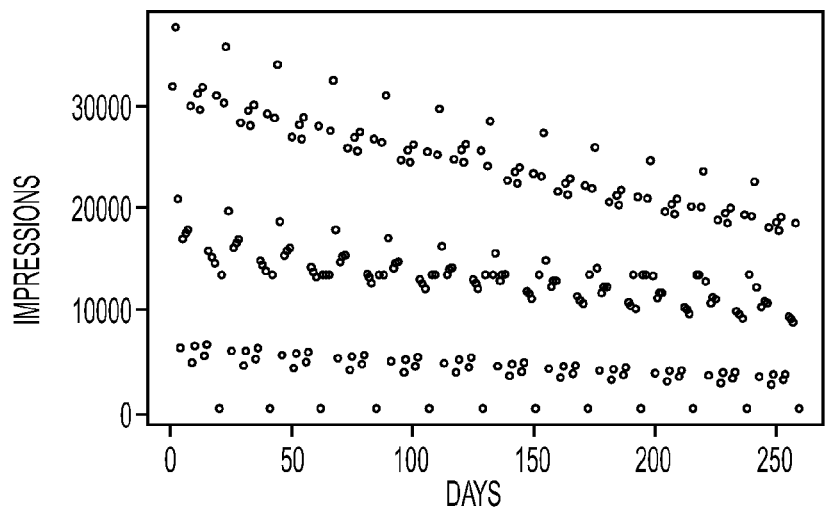
FIG. 11 is a graphical representation of a second time series of impressions.
Figure 12:
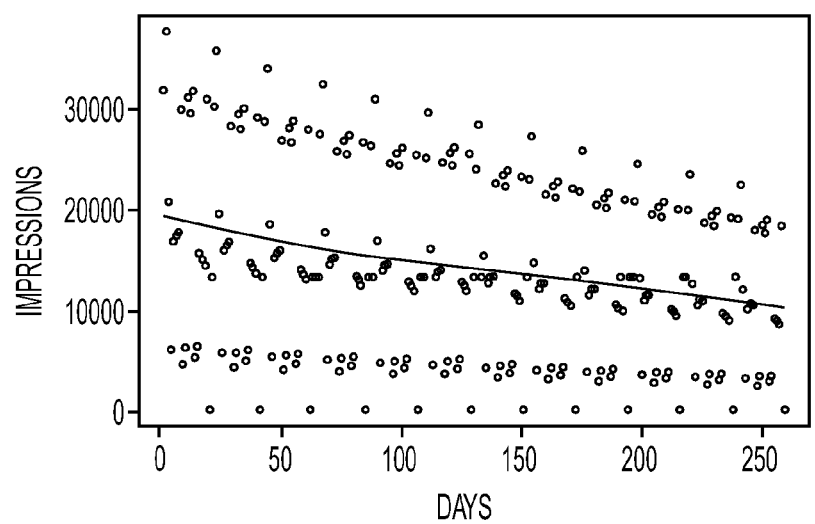
FIG. 12 is a graphical representation of the time series of FIG. 11 with loess smoothing.
Figure 13:
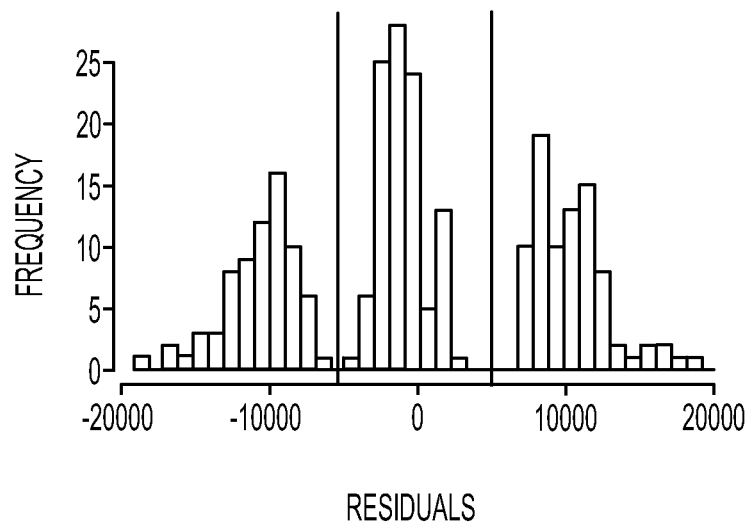
FIG. 13 is a histogram computed with the smoothed time series of FIG. 12.
Figure 14:
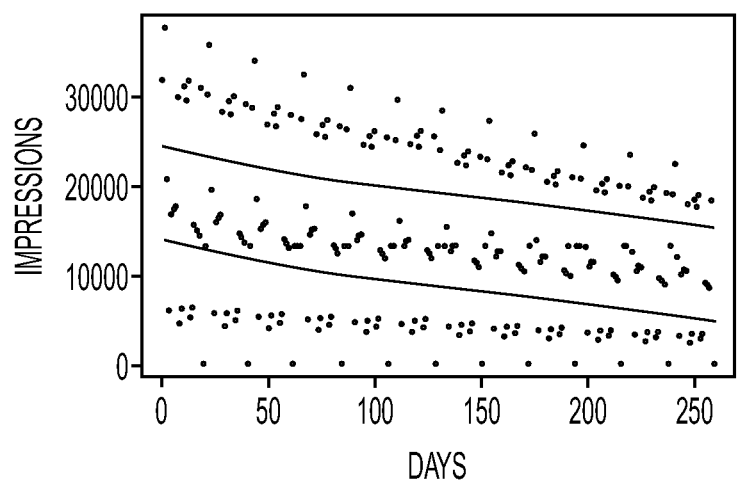
FIG. 14 is a graphical representation of a partitioned FIG. 12.
Figure 15:
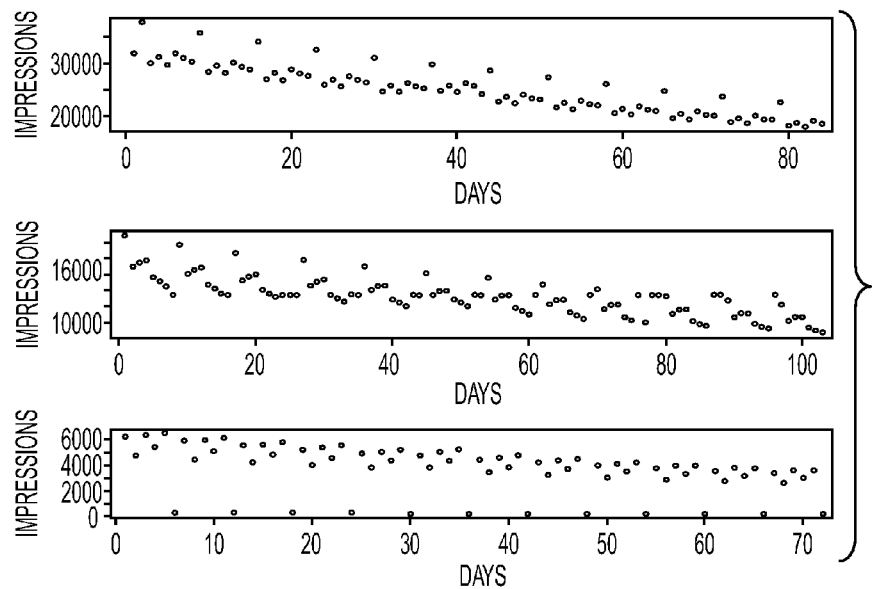
FIG. 15 graphically represents three components of FIG. 14.
Figure 16:
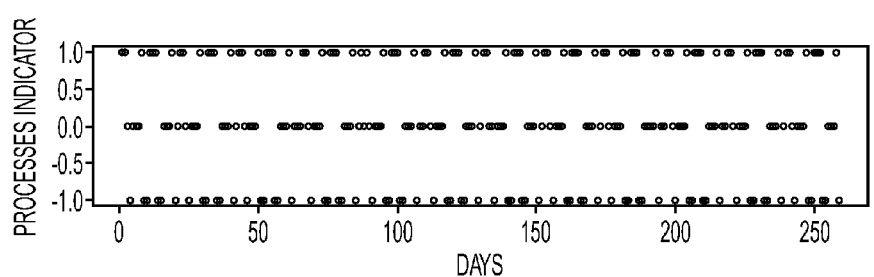
FIG. 16 graphically illustrates the three components of FIG. 15 as three categories or processes.

Referring to FIG. 11, a second time series of impressions is shown. Applying the above-described approach of the disclosed embodiments to this time series, loess smoothing may be performed (FIG. 12) and thresholds obtained from a computed histogram (FIG. 13). Using the the thresholds, the smoothed time series may be partitioned (FIG. 14) and then broken out into multiple components—three components in the example of FIG. 15. Referring to FIG. 16, a graphical representation for the S process is provided.

Figure 17:
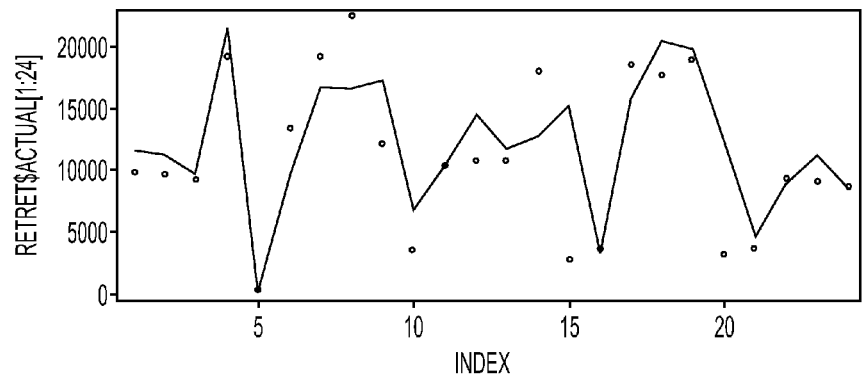
FIG. 17 graphically represents a forecast based on ARIMA $(3,2,3)\times(2,2,3)_{11}$.
Figure 18:
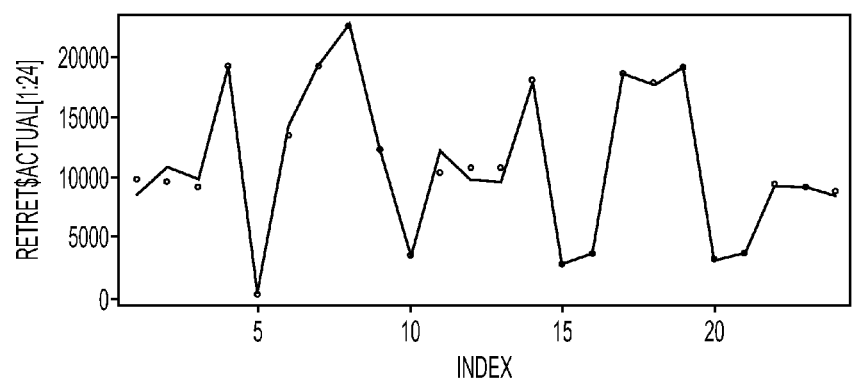
FIG. 18 graphically represents a forecast obtained in accordance with the disclosed embodiments with the components of FIG. 15.

Referring to FIG. 17, the time series data is plotted with the forecasts from the best fitting ARIMA model ARIMA (3,2, 3)×(2,2,3)$_{11}$ which has a MAPE of 0.18. By contrast, referring to FIG. 18, a forecast obtained with the components of FIG. 15 and the corresponding S process is shown. The MAPE for the second case is 0,01. The models for the second case obtained in accordance with the disclosed embodiments include:

Top: ARIMA (5,1,1)×(0,1,0)$_7$;
Middle: ARIMA(0,2,8)×(0,2,1)9;
Bottom: ARIMA(1,2,1)×(1,2,1)$_6$; and
S: Multinom(X12~X1+ . . . +X11) (i.e., looks back 11 obs to forecast the next one).

The disclosed embodiments demonstrates that if time series can be segmented into individual time series that can be modeled well by a popular method like ARIMA, then the individual models can be forecast and the proper forecast used at the right time. The process that chooses among an interleaved time series is a selector process—a random process that takes on categorical variables. The selector process can be suitably obtained through use of multinomial logistic regression.

The following are some observations regarding the disclosed embodiments:

1) It is believed that the approach disclosed above provides a significant increase in time series forecasting accuracy (at least with respect to the area of demand forecasting) by segmenting a time series into time series components, each of which component can be forecast with relatively high accuracy.
2) Time series components are not necessarily simple, at least in the examples studied. They may possess differing periods and trends.
3) A substantial number of time series cannot be further decomposed by database fields, nor, at least with respect to the examples studied by this inventor, are there identifiable patterns associated with day of the week or month.
4) As an aggregate, a time series may have changing (deceasing or increasing) variance. This confounds many time series models.
5) While the observation that multinomial regression works well with respect to demand forecasting may appear surprising, in a significant number of instances, multinominal regression out-performed other machine-learning methods.
7) The types of time series described above do not appear to be uncommon. For example, out of 78 time series extracted from one exemplary account, 19 of these exhibited a structure toward which the disclosed embodiments are directed.

Based on the above description, the following features of the disclosed embodiments should now be apparent:

The above-described print demand forecasting system smoothes print demand data to obtain smoothed values. A histogram may be computed with the smoothed values so that at least one threshold may be obtained, the at least one threshold being used to segment the print demand data. A graphical representation of the segmented print demand data may be used to obtain the above-mentioned S process.

The above-described technique uses first and second forecast models, with each of the first forecast model and the second forecast model possibly being selected from one of a plurality of forecast models. In one example, the one of a plurality of forecast models is an ARIMA based model.

The selector process may be obtained from one of a plurality of models. In one example, the one of a plurality of models comprises a multinominal regression model. Use of the multinominal logistic model may include solving multiple logistic regression equations, the multiple logistic regression equations varying as a function of first and second time series components.

The print demand data may be collected with a data collection tool, wherein the print demand data corresponds with print impressions produced over a selected time interval. In one example, the data collection tool, a computer implemented service manager, and a plurality of document production centers all communicate with one another by way of a network. In practice, forecast data, obtained in accordance with the disclosed embodiments, may be transmitted to the plurality of document production centers.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A print demand forecasting system for use with a print production system in which multiple print jobs are processed over a selected time interval, comprising:
    a data collection tool, said data collection tool collecting print demand data for each print job processed during the selected time interval;
    mass memory for storing the collected print demand data;
    a computer implemented service manager for processing the stored print demand data to obtain a first time series component and a second time series component, said computer implemented service manager corresponding the first time series component with a first forecast model and the second time series component with a second forecast model; and
    a selector process, operating with said computer implemented service manager to select one of the first forecast model and the second forecast model by:
        solving a plurality of first logistic regression equations associated with the first forecast model to determine a first estimation of one or more probability values for a next observation, wherein the plurality of first logistic regression equations vary as a function of the first time series component,
        solving a plurality of second logistic regression equations associated with the second forecast model to determine a second estimation of one or more probability values for a next observation, wherein the plurality of second logistic regression equations vary as a function of the second time series component,
        wherein one or more of the first estimation and the second estimation have an error of 2.4% or less, and
        selecting one of the first forecast model and the second forecast model whose estimation is associated with a highest probability value,
    wherein the selected one of the first forecast model and the second forecast model is used to obtain forecast data forecasting print production demand for a selected time outside of the selected time interval, wherein the selector process is configured to:
        smooth the print demand data to obtain smoothed values,
        compute a histogram with the smoothed values,
        obtain at least one threshold from the histogram, and
        use the at least one threshold to segment the print demand data.

2. The print demand forecasting system of claim 1, wherein a graphical representation of the segmented print demand data is used to obtain said selector process.

3. The print demand forecasting system of claim 1, wherein each of the first forecast model and the second forecast model is selected from one of a plurality of forecast models.

4. The print demand forecasting system of claim 3, wherein the one of a plurality of forecasting models is an auto regressive integrated moving average (ARIMA) based model.

5. The print demand forecasting system of claim 1, wherein one of a plurality of models is used to obtain said selector process.

6. The print demand forecasting system of claim 5, wherein the one of a plurality of models comprises a multinomial logistic regression model.

7. The print demand forecasting system of 1, wherein said data collection tool collects data corresponding with print impressions produced over the selected time interval.

8. The print demand forecasting system of claim 1, in which said computer implemented service manager communicates with a plurality of document production centers by way of a network, wherein the forecast data is transmitted to one of more of the plurality of document production centers.

9. A print demand forecasting method for use with a print production system in which multiple print jobs are processed over a selected time interval, comprising:
    collecting print demand data for each print job processed during the selected time interval;
    storing the collected print demand data in memory;
    smoothing the print demand data to obtain smoothed values;
    computing a histogram with the smoothed values;
    obtaining at least one threshold from the histogram;
    using the at least one threshold to segment the print demand data;
    processing by a computer implemented service manager comprising a processing platform, the segmented print demand data to obtain a first time series component and a second time series component;
    corresponding the first time series component with a first forecast model and the second time series component with a second forecast model;
    selecting by the computer implemented service manager comprising the processing platform, one of the first forecast model and the second forecast model by:
        solving a plurality of first logistic regression equations associated with the first forecast model to determine a first estimation of one or more probability values for a next observation, wherein the plurality of first logistic regression equations vary as a function of the first time series component,
        solving a plurality of second logistic regression equations associated with the second forecast model to determine a second estimation of one or more probability values for a next observation, wherein the plurality of second logistic regression equations vary as a function of the second time series component, wherein one or more of the first estimation and the second estimation have an error of 2.4% or less, and
selecting one of the first forecast model and the second forecast model whose estimation is associated with a highest probability value; and
using the selected one of the first forecast model and the second forecast model to obtain forecast data forecasting print production demand for a selected time outside of the selected time interval.

10. The print demand forecasting method of claim 9, developing a graphical representation of the segmented print demand data.

11. The print demand forecasting method of claim 10, in which said selecting is performed with a selector process, further comprising using the graphical representation of the segmented print demand data to obtain said selector process.

12. The print demand forecasting method of claim 9, further comprising selecting each of the first forecast model and the second forecast model from a plurality of forecast models.

13. The print demand forecasting method of claim 12, wherein the one of a plurality of forecast models is an auto regressive integrated moving average (ARIMA) based model.

14. The print demand forecasting method of claim 9, in which said selecting is performed with a selector process, further comprising using one of a plurality of models to obtain the selector process.

15. The print demand forecasting method of claim 14, wherein the one of a plurality of models comprises a multinomial logistic regression model.

* * * * *